United States Patent [19]

Iwashita et al.

[11] 3,999,197

[45] Dec. 21, 1976

[54] FILM REWINDING DEVICE FOR CAMERAS

[75] Inventors: Tomonori Iwashita, Chofu; Shohei Ohtaki, Machida; Susumu Kozuki, Yokohama; Nobuaki Date, Kawasaki; Soichi Nakamoto, Machida, all of Japan

[73] Assignee: Canon Kabushiki Kaisha, Tokyo, Japan

[22] Filed: Sept. 2, 1975

[21] Appl. No.: 609,438

[30] Foreign Application Priority Data

Sept. 3, 1974 Japan .......................... 49-101179
Oct. 18, 1974 Japan .......................... 49-119938

[52] U.S. Cl. .............. 354/173; 242/191; 352/92; 352/124; 354/214
[51] Int. Cl.² .......................................... G03B 1/18
[58] Field of Search ............ 354/173, 214; 352/92, 352/124; 242/186, 191, 71.6

[56] References Cited

UNITED STATES PATENTS

| | | | |
|---|---|---|---|
| 3,598,033 | 8/1971 | Sasaki | 354/214 |
| 3,656,420 | 4/1972 | Aizawa et al. | 354/173 |

*Primary Examiner*—John Gonzales
*Attorney, Agent, or Firm*—Toren, McGeady and Stanger

[57] ABSTRACT

A film rewinding device for a camera using a motor for rewinding film. Upon completion of film rewinding, the device automatically stops the film rewinding operation with detecting means disposed in the device to detect the completion of film rewinding. This is done by utilizing the difference between the load on the motor during the rewinding operation and the load at the completion of the rewinding operation.

7 Claims, 6 Drawing Figures

FILM REWINDING DEVICE FOR CAMERAS

BACKGROUND OF THE INVENTION

1. Field of the Invention

This invention relates to a film rewinding device and particularly to a rewinding operation when the film parts from a take-up spool.

2. Description of the Prior Art

When a film contained in a film magazine, such as a 35 mm still camera film, is used for photographing, the film, which has been rewound to the inside of a film magazine upon completion of photographing, must be again pulled out for processing by a developing machine. At that time, the film can be readily pulled out if the tip of the film remains outside the magazine. However, if the film has been completely rewound without leaving the film end outside the magazine, it must be taken out by breaking the magazine or by using a special tool.

In the case of a 35 mm camera, such troubles may be avoided by rewinding the film by hand after completion of photographing, and by feeling a change in the torque of a rewinding shaft to stop the rewinding operation before the film is completely rewound to the inside of a film magazine. However, in cases where such film rewinding is accomplished with an electric driving device means for automatically stopping such film rewinding by detecting the completion of rewinding is necessary. In the conventional electric film driving device, means for mechanically detecting the presence or absence of film on a take-up spool is disposed inside the camera. With such means provided, the operation of a rewinding motor disposed on the side of the electric driving device is stopped in response to a signal of the mechanical detecting means. The stopping arrangement of this type necessitates the provision of the mechanical detecting means on the side of the camera. This complicates the structure of the camera while the simplification of the structure is desired for making the camera compact and light in weight. On the other hand, such detecting means are unnecessary for camera operators who are using no electric driving device in combination with the camera. For such people, an increase in the price of a camera due to such unnecessary detecting means is hardly acceptable.

It is therefore an object of this invention to provide a film rewinding device which automatically stops the film rewinding operation with detecting means disposed in the rewinding device for detecting the variation of the film rewinding load of a rewinding mechanism.

It is another object of this invention to provide an electric circuit which applies a braking action to a rewinding motor when the film rewinding operation is to be automatically stopped.

These and other objects of this invention will be understood from the following description of preferred embodiments thereof when read in connection with the accompanying drawings, in which:

DESCRIPTION OF THE PREFERRED EMBODIMENTS

Figure 1:
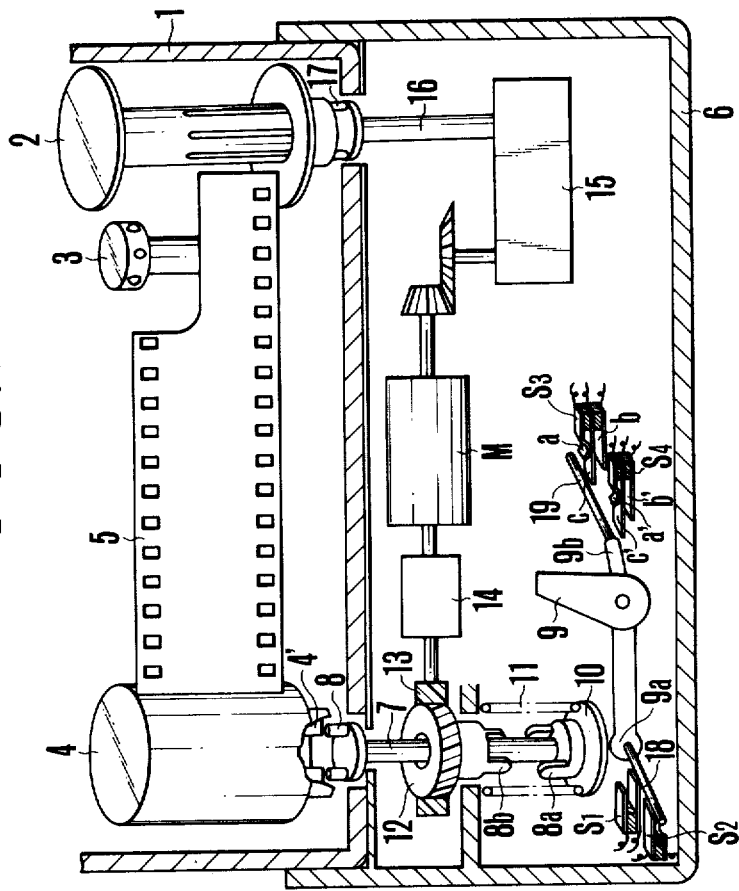
FIG. 1 is a schematic illustration of an embodiment of this invention illustrating an electric driving device of a camera incorporating a film rewinding device.

An embodiment of this invention is described as follows: In FIG. 1 illustrating an electric driving device which is provided with a rewinding device, the reference numeral 1 indicates a camera body; 2 a take-up spool; and 3 a sprocket. The reference numeral 4 indicates a film magazine placed in the camera body and 5 a film. A rewinding shaft 7 which is provided in an electric rewinding device 6 has a coupler 8 at the upper end of it for engagement with a spool shaft 4'. A claw clutch part 8a and a disc 10 which engages with one end 9a of a rewinding lever 9 are secured to the lower end of the rewinding shaft. Between the body of the electric rewinding device 6 and the disc 10, there is provided a spring 11 which constantly urges the rewinding shaft 7 downward. The middle portion of the rewinding shaft 7 pierces through a worm wheel 12 which is rotatably supported by the body of the electric rewinding device 6. Another claw clutch part 8b is secured to the lower part of the worm wheel 12. The worm wheel is coupled with a motor M through a worm 13 and a reduction gear 14. The shaft of the motor M on the opposite side is coupled to a take-up shaft 16 through a film take-up control mechanism. The film is wound up by the rotation of the motor M in the normal direction through a take-up coupler 17 and the spool 2 provided on the side of the camera. As for a shutter release arrangement of the camera, an ordinary known electric releasing device which is not illustrated is disposed in the electric rewinding device 6 to permit an electric shutter releasing operation.

A pin 18 is attached to one end 9a of the rewinding lever 9, which is rotatably held by the body of the electric rewinding device, while another pin 19 is attached to the other end 9b of the lever 9. A normally open type switch $S_1$ is turned on by the pin 18 when the rewinding lever 9 turns clockwise. A normally closed type switch $S_2$ is turned off by the pin 18 when the rewinding lever 9 turns clockwise. On the other hand, when the lever 9 turns clockwise, the pin 19 causes double throw switches $S_3$ and $S_4$ to shift from their normally closed conditions in which contacts $a$ and $a'$ are in contact with contacts $c$ and $c'$ respectively to their normally open conditions in which contacts $b$ and $b'$ are in contact with $c$ and $c'0$ respectively.

Figure 2:
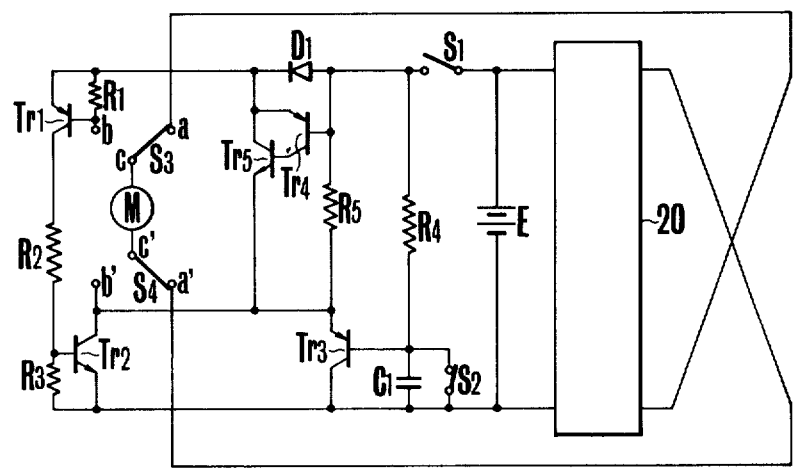
FIG. 2 is a circuit diagram illustrating a control circuit of the electric driving device of the camera illustrated in FIG. 1.

In FIG. 2, E indicates a power source, 20 a film take-up, shutter release control circuit. A detecting circuit which detects an electric current flowing to the motor M is composed of a resistance $R_1$ which is connected in series with the motor and a transistor $Tr_1$. Transistors $Tr_2$ and $Tr_3$ form a control circuit which controls the supply from the power source E. A time constant circuit which is provided for effecting power supply to the motor M at the time of starting the rewinding operation is composed of a resistance $R_4$ and a capacitor $C_1$. A control circuit for the motor M is composed of transistors $Tr_4$ and $Tr_5$, a resistance $R_5$ and a diode $D_1$.

The embodiment of this invention which is arranged as described in the foregoing operates as follows:

The shutter release and film winding are accomplished with the switches $S_3$ and $S_4$ set in their respective normally closed positions, i.e. contact $a$ and $a'$ are respectively in contact with contacts $c$ and $c'$; and, thus, the motor M is rotated through a film take-up control mechanism 15, an unillustrated electric release mechanism and the film take-up, shutter release control circuit 20. Upon completion of photographing a preset number of frames, electrical rewinding is accomplished by pushing an unillustrated button R to make the sprocket 3 freely rotatable. Then, the rewinding lever 9 is turned clockwise. With the rewinding lever turned clockwise, the pin 18 turns on the switch $S_1$ and turns off the switch $S_2$ while, at the same time, the pin 19 shifts the switches $S_3$ and $S_4$ from their respective closed positions same times open positions and the contacts $b$ and $b'$ come into contact with contacts $c$ and $c'$ respectively. Concurrently, one end 9a of the rewindng lever pushes up the rewinding shaft 7 against the force of the spring 11. This causes the claw clutch part 8a to engage with the corresponding part 8b. When the switch $S_1$ is turned on by the above stated operation, a voltage from the power source E is impressed on the rewinding circuit and, at the same, the switch $S_2$ is turned off to release a short circuit between two ends of the capacitor $C_1$. Since this makes the transistor $Tr_3$ conductive, there is formed a closed circuit comprising the power source E, switch $S_1$, diode $D_1$, resistance $R_1$, switch $S_3$ ($b - c$), motor M, switch $S_4$ ($b' - c'$), transistor $Tr_3$ and power source E. This causes the motor M to rotate in the reverse direction. The reverse rotation of the motor M is transmitted to the spool shaft 4' of the film magazine 4 through the reduction gear 14, worm 13, worm wheel 12, claw clutch 8a and 8b, rewinding shaft 7, and rewinding coupler 8. By this, the film is rewound into the film magazine. When the rewinding begins, the value of a current flowing to the motor M increases due to the load of each part that rotates as the rewinding proceeds. Assuming that the current value at that time is I$a$ and the value of the resistance $R_1$ is $r_1$, the voltage $V_{BE}$ between the base and the emitter of the transitor $Tr_1$ is expressed by $$V_{BE} = \text{I}a \times r_1.$$

Then, when the value of $r_1$ is set to satisfy $$\text{I}a \times r_1 \geq 0.6 \text{ volt},$$

there obtains a forward bias condition between the base and the emitter of the transistor $Tr_1$ and this results in a conductive condition. Accordingly, the transistor $Tr_2$ also becomes conductive. The time constant of the resistance $R_4$ capacitor $C_1$ which constitute a time constant circuit is set to be shorter than the time required for rewinding. Therefore, the time constant circuit makes the transistor $Tr_3$ nonconductive before completion of the rewinding operation. At that moment, however, the transistor $Tr_2$ has already been made to be conductive as stated above, so that the reverse rotation of the motor M continues.

When the rewinding operation has been completed with the film 5 having come to part from the take-up spool 2 (a condition as illustrated in FIG. 1), the take-up spool ceases to rotate. Then, with the rotation of the take-up spool coming to a stop, the rewinding load decreases and the value of the current flowing to the motor M also decreases. Assuming that the value of the current at this moment is I$b$, the voltage $V_{BE}$ between the base and the emitter of the transistor $Tr_1$ is expressed by $$V_{BE} = \text{I}b \times r_1.$$

Figure 3:
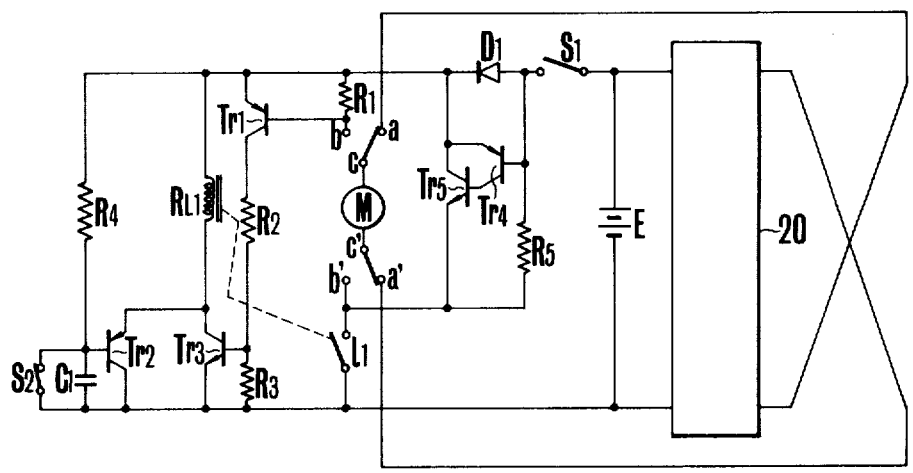
FIG. 3 is a circuit diagram illustrating a modification of the circuit illustrated in FIG. 2.

Then, when the value of $r_1$ is set to satisfy $$\text{I}b \times r_1 < 0.6 \text{ volt},$$

there obtains a backward bias condition between the base and the emitter of transistor $Tr_1$. Therefore, the transistor $Tr_1$ becomes nonconductive. Accordingly, another transistor $Tr_2$ also becomes nonconductive. Since the transistor $Tr_3$ has already become nonconductive, the voltage from the power source to the motor M is cut off. The transistors $Tr_4$ and $Tr_5$ are then made to be conductive by the electromotive force of the motor M. This short-circuits the motor M to stop it instantaneously and the rewinding operation comes to a stop. Following this, when the rewinding lever 9 turns counterclockwise, each part reverts to its phase on the rewinding side. FIG. 3 shows a modification example of the circuit illustrated in FIG. 2 with like parts indicated by like reference numerals. In FIG. 3, the on-off control of the motor M is not directly accomplished by means of transistors but is accomplished through a relay $RL_1$. When either one of the transistors $Tr_2$ and $Tr_3$ is conductive, a current flows to the relay $RL_1$ to turn on the switch $l_1$ thus causing the motor to make reverse rotation. When both of the transistors $Tr_2$ and $Tr_3$ become nonconductive with the rewinding operation having been completed, the current no longer flows to the relay $RL_1$. Then the switch $l_1$ is turned off and the supply from the power source E to the motor M is cut off. In accordance with the embodiment of FIG. 3, the power source voltage can be efficiently utilized for driving the motor without being affected by the voltage drop (0.6 volt) which is caused by the transistors $Tr_2$ and $Tr_3$. The results of experiments show that I$a$ is about 500mA and I$b$ about 200 mA. Assuming that $r_1$ is 1.2Ω, there obtains the following relation:

$$\text{I}a \times r_1 = 500 \text{ mA} \times 1.2\Omega = 0.6 \text{ volt}$$

$$b \times r_1 = 200 \text{ mA} \times 1.2\Omega = 0.24 \text{ volt}$$

Then, the motor promptly comes to a stop upon completion of rewinding, which is stopped before the film is completely taken up inside the film magazine.

Figure 4:
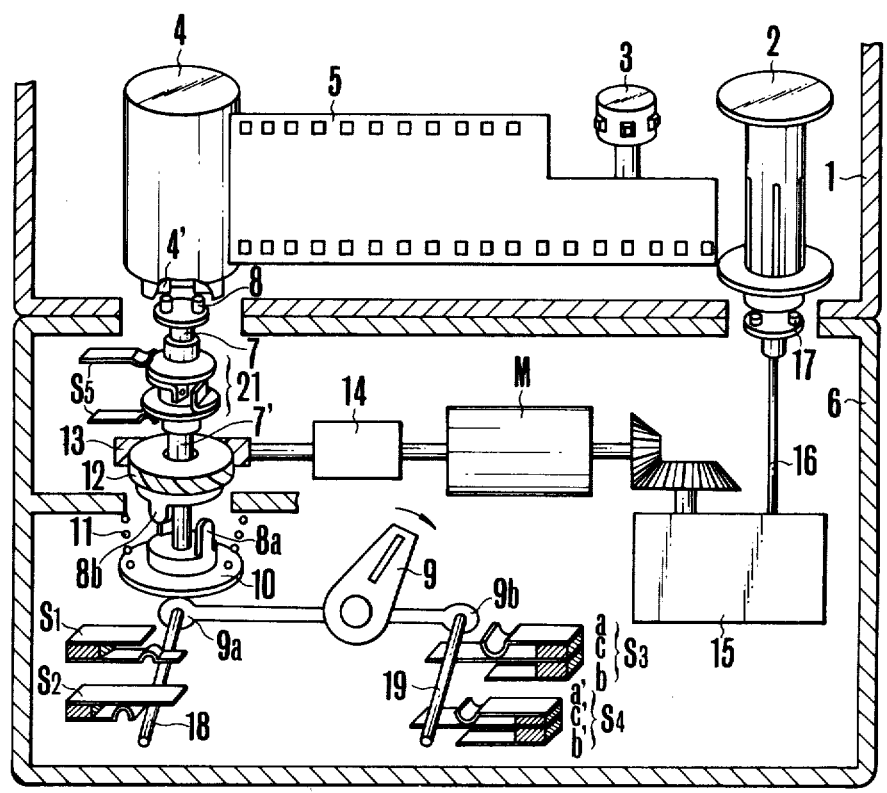
FIG. 4 is a schematic illustration of another embodiment of this invention illustrating an electric driving device of a camera incorporating a film rewinding device.
Figure 5:
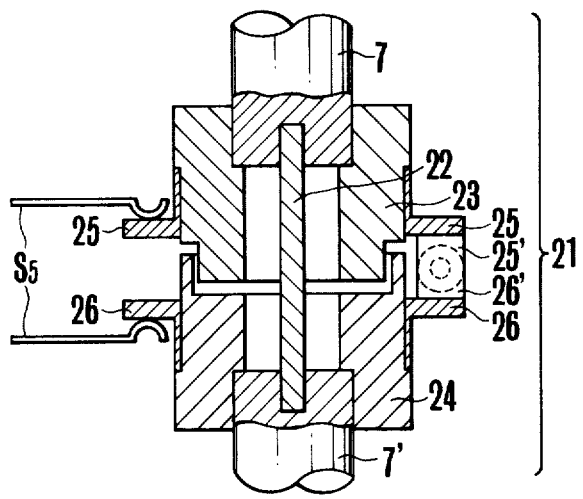
FIG. 5 is a sectional drawing illustrating the details of a rewinding detector of the electric driving device of the camera illustrated in FIG. 4.
Figure 6:
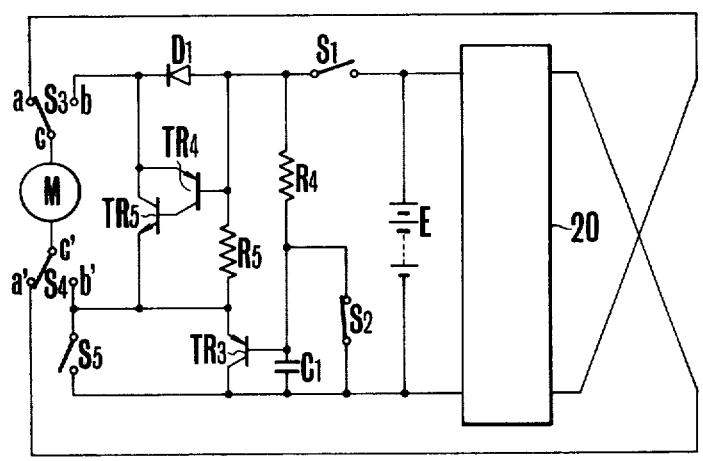
FIG. 6 is a circuit diagram illustrating a control circuit of the electric driving device of the camera illustrated in FIG. 4.

In the embodiments described in the foregoing, the change of the load on the motor is detected by electrical detecting means. However, the present invention is not limited to such and a mechanical detecting arrangement may be employed as shown in FIG. 4. In the embodiment shown in FIG. 4, a load detector 21 is disposed between the rewinding shaft 7 which is provided with the take-up coupler 8 and the shaft 7' which is provided with the disc. This load detector 21 is formed as illustrated in FIG. 5. The reference numeral 22 indicates a flexible joint connecting the rewindng shaft 7 and the shaft 7'. A plate spring is shown in the drawing. However, a coil spring may be used as the flexible joint instead of the plate spring. Reference numerals 23 and 24 respectively indicate cylindrical insulators provided on the rewinding shaft 7 and the shaft 7'. Cylindrical conductors 25 and 26 which are respectively provided with contacts 25' and 26' are secured to these insulators. With contacts 25' and 26' provided on these cylindrical conductors, an on-off switch $S_5$ is formed by them, the switch being arranged to close according to the leaning degree of the flexible joint. In other words, the switch remains open while the load is relatively small and comes to close when the load exceeds a given value.

After completion of photographing a preset number of frames, as already mentioned in the foregoing, electric rewinding is accomplished by depressing an unillustrated button R to make the sprocket 3 freely rotatable and then by turning the rewinding lever 9 clockwise. In response to the clockwise rotation of the rewinding lever, the pin 18 turns the switch $S_1$ on and the switch $S_2$ off. At the same time, the switches $S_3$ and $S_4$ are shifted from their respective contact positions of $a - c$ and $a' - c'$ to their contact positions of $b - c$ and $b' - c'$.

Concurrently with this, one end 9a of the rewinding lever pushes the shaft 7' and the rewinding shaft 7 upward in opposition to the spring 11 thus causing the claw clutch parts 8a and 8b to engage with each other. With the switch $S_1$ turned on, the power from the power source E is supplied to the rewinding circuit and, with the switch $S_2$ turned off at the same time, the short-circuit between the two ends of the capacitor $C_1$ is released. This makes the transistor $Tr_3$ conductive to form a closed circuit consisting of the power source E, switch $S_1$, diode $D_1$, switch $S_3$ ($b - c$), motor M, switch $S_4$ ($b' - c'$), transistor $Tr_3$ and power source E; and the motor M rotates in the reverse direction. The reverse rotation of the motor is transmitted to the film magazine through the reduction gear 14, worm 13, worm wheel 12, claw clutch 8b and 8a, shaft 7', load detector 21, rewinding shaft 7 and rewinding coupler 8. Then the film 5 is rewound to the inside of the film magazine.

With the rewinding operation having started, the load of each part that rotates during the rewinding operation causes the flexible joint to begin leaning. The leaning of the flexible joint closes the switch 25' and 26' formed by the cylindrical conductors 25 and 26. In other words, the rewinding shaft continues to rotate with the switch $S_5$ being turned on.

In this instance, the time constant of the resistance $R_1$ and capacitor $C_1$, which for a time constant circuit required for maintaining the transistor $Tr_3$ in a conductive state, is preset at a value shorter than the time required for the rewinding operation. During the rewinding operation, when the transistor $Tr_3$ is made to be nonconductive due to the time constant circuit, the switch $S_5$ has already become conductive. Therefore, the power is supplied to the motor through the switch $S_5$ and the reverse rotation of the motor continues.

With the rewinding operation completed, when the film 5 comes off the take-up spool 2, the spool ceases to rotate. This results in a decrease of the rewinding load and, accordingly, the leaning degree of the flexible joint in the load detector 21 provided at the rewinding shaft 7 and the shaft 7' also comes to decrease. The contacts 25' and 26' revert to an open state and the switch $S_5$ is turned off. It is of course necessary to adjust the strength of the plate spring 22 beforehand in relation to the opening and closing of the switch $S_5$ according to the value of the load and to the extent of decrease in the load at the end of the rewinding operation. With the switch $S_5$ opened, the supply from the power source E to the motor E is cut off as the transistor $Tr_3$ has already been made to be nonconductive. Since both the transistors $Tr_4$ and $Tr_5$ are made to be conductive by the electromotive force of the motor M, the two ends of the motor M is short-circuited and the motor is instantaneously stopped thereby to discontinue the rewinding operation.

Upon completion of rewinding, the rewinding lever 9 is turned counterclockwise to bring each parts back to the phase on the film take-up side.

As described in the foregoing, in accordance with this invention, the rewinding completion detecting mechanism works the instant the film parts from the take-up spool to immediately apply the brake, so that the rewinding operation can be completely stopped before the film is entirely rewound into the film magazine.

Furthermore, in accordance with this invention, the detection of the completion of film rewinding can be accomplished all on the side of an electric rewinding device in cases where the camera and the electric rewinding device are arranged as separate units. This obviates the necessity of providing the camera body with additional parts which complicate the structure of the camera. In addition to such advantages, the motor can be driven irrespective of the detecting means while the rewinding load is still unstable at the beginning of the rewinding operation. This ensures a smooth start-up of the rewinding operation eliminating troubles that are incidental to the beginning of rewinding.

What is claimed is:

1. A film rewinding device for cameras which comprises:
   a rewinding member which can be brought into engagement with a film magazine inserted in the camera, said member being movable between a first position in which the member engages with the film magazine and a second position in which it does not engage with the film magazine;
   operating means which causes said rewinding member to move from the first position to the second position and vice versa;
   driving means for driving said rewinding member to cause the member to perform a rewinding operation;
   detecting means for detecting whether the rewinding operation has been completed or is proceeding, the variance of the load on said rewinding member being detected by the detecting means; and
   means for controlling said driving means, said means including:
   a. a first electric circuit which starts up said driving means and supplies electric power to the driving means for a preset period of time;
   b. a second electric circuit which operates the driving means by beginning to supply an electric power to the driving means in response to a detection output of said detecting means representing that the rewinding operation is proceeding and by stopping the power supply in response to a detection output of the detecting means representing the completion of rewinding; and
   c. a first switching means for actuating the first and second electric circuits, the switching means being arranged to be turned on in response to the movement of the rewinding member to the first position caused by said operating means.

2. A device according to claim 1, in which said driving means is a motor.

3. A device according to claim 2, wherein said first electric circuit includes a time constant circuit and a switching element coupled to said motor, said switching element being arranged to turn off after a length of time determined by the time constant circuit.

4. A device according to claim 3, wherein said second electric circuit includes switching means which operates on or off in accordance with the detection output of said detecting means, the switching means being connected in parallel with said switching element.

5. A device according to claim 4, wherein said detecting means includes a flexible member which leans to varying degrees according to the load placed on said rewinding member; and said switching means is turned on or off according to the leaning degree of the flexible member varies.

6. A device according to claim 2, which further comprises a transistor braking circuit connected in parallel with said motor, the circuit being arranged to apply the brake with the transistors thereof controlled by the electromotive force of said motor.

7. A film rewinding device for cameras which comprises:
a rewinding member which can be brought into engagement with a film magazine inserted in the camera, said member being movable between a first position in which the member engages with the film magazine and a second position in which it does not engage with the film magazine;

operating means which causes said rewinding member to move from the first position to the second position and vice versa;

driving means for driving said rewinding member to cause the member to do a rewinding operation; and means for controlling said driving means, said means including:
a. a first electric circuit which detects whether the rewinding operation has been completed or is proceeding with the variance of electric current flowing to said driving means being detected by the circuit;
b. a second electric circuit which starts up said driving means and supplies electric power to the driving means for a present period of time;
c. a third electric circuit which operates the driving means by beginning to supply an electric power to the driving means in response to a detection output of the first electric circuit representing that rewinding is proceeding and by stopping the power supply in response to a detection output of the first circuit representing the completion of rewinding; and
d. a first switching means for actuating the first, second and third electric circuits, the switching means being arranged to be turned on in response to the movement of the rewinding member to the first position caused by said operating means.

* * * * *